Figure 1:
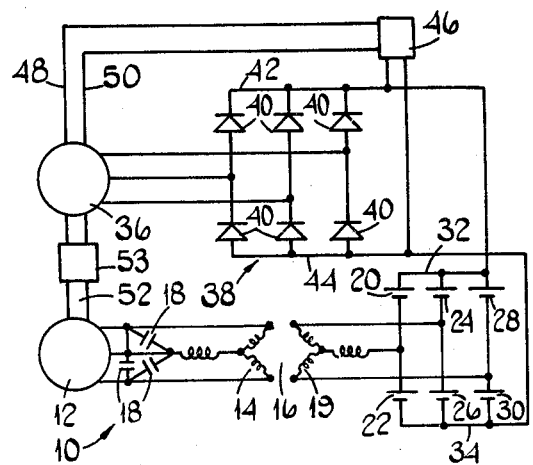

United States Patent [19]

Silvertown et al.

[11] 4,222,000
[45] Sep. 9, 1980

[54] BATTERY HEATING SYSTEM

[75] Inventors: Cyril Silvertown, London; Walter Sinclair, Westoning, both of England

[73] Assignee: Lucas Industries Limited, Birmingham, England

[21] Appl. No.: 922,282

[22] Filed: Jul. 6, 1978

[30] Foreign Application Priority Data

Jul. 15, 1977 [GB] United Kingdom ............... 29894/77
Dec. 31, 1977 [GB] United Kingdom ............... 54394/77

[51] Int. Cl.² .......................... H02J 7/14; H05B 9/00
[52] U.S. Cl. ..................................... 320/35; 219/200; 322/33; 429/120
[58] Field of Search ..................... 320/2, 4, 15, 35, 61; 219/202, 203, 200; 429/120; 322/25, 29

[56] References Cited

U.S. PATENT DOCUMENTS

| 2,679,549 | 5/1954 | Rezek et al. | 219/202 |
| 2,899,623 | 8/1959 | Medlar | 320/4 X |
| 3,233,164 | 2/1966 | Tyler | 322/29 X |
| 3,663,946 | 5/1972 | Iwaki | 322/25 X |
| 3,668,419 | 6/1972 | Cherry et al. | 219/202 X |
| 3,899,730 | 8/1975 | Volontieri | 219/203 X |

FOREIGN PATENT DOCUMENTS 1047303 11/1966 United Kingdom ..................... 320/61

Primary Examiner—Robert J. Hickey
Attorney, Agent, or Firm—Kane, Dalsimer, Kane, Sullivan and Kurucz

[57] ABSTRACT

A battery heating system comprises a number of storage batteries and an alternator driven by a variable speed prime mover connected to supply AC heating current to the batteries. The system is arranged so that the AC current is substantially constant over the working speed range of the prime mover.

8 Claims, 4 Drawing Figures

BATTERY HEATING SYSTEM

The present invention relates to a system for heating electric storage batteries in low temperature conditions.

When batteries are used in low temperature conditions, it may be necessary to heat their electrolyte. This may be done by supplying the batteries with an alternating current, the internal resistance of the batteries causing heat to be dissipated which raises the temperature of the electrolyte. However, it is sometimes required to raise the temperature of the battery over a wide range and there is a risk of over heating the battery if its internal resistance becomes very low. Similarly, if the alternating current is provided by an alternator driven by a prime mover, such as a motor vehicle IC engine, the heating current may be too low at low speeds and excessive at high speeds.

It is an object of the present invention to provide a new or improved battery heating system in which the above mentioned problem is overcome or reduced.

According to the present invention there is provided a battery heating system comprising at least one storage battery, an alternator connected to supply alternating current to the battery or batteries, and a prime mover for driving the alternator, the arrangement of the alternator being such that the alternating current supplied to the battery or batteries remains at a substantially constant value over the normal working speed range of the prime mover.

The substantially constant alternating current can be obtained by ensuring that the effective output impedance of the alternator is very much higher than the maximum battery internal resistance. This may be achieved either by using a permanent magnet alternator or by using an alternator with a field winding and a field control which is sensitive to the output current of the alternator.

The present invention will now be described in more detail, by way of example, with reference to the accompanying drawings in which FIGS. 1 to 4 are circuit diagrams of combined battery heating and charging systems embodying the present invention.

Referring now to FIG. 1, there is shown a combined battery heating and charging system 10 comprising a three phase permanent magnet alternator 12, the output of which is connected to the star connected primary winding 14 of a transformer 16. The output of alternator 12 may also be connected to three capacitors 18 which are delta connected. The secondary winding 19 of the transformer 16 is connected to the common points of three pairs of series connected batteries 20 and 22, 24 and 26, and 28 and 30, the pairs of batteries being connected between lines 32 and 34.

The design of the alternator 12 and the transformer 16 is such that the effective output impedance of the alternator is an order of magnitude higher than the maximum battery internal resistance (referred to the transformer primary circuit).

The system 10 also includes a second three phase alternator 36, the output of which is connected through a rectifier 38 having six diodes 40. The rectifier 38 supplies positive and negative lines 42 and 44 which are connected respectively to lines 32 and 34 for charging the batteries. A voltage regulator 46 is also positioned across lines 42 and 44 and is connected to the alternator 36 through lines 48 and 50.

Both alternators 12 and 36 are driven by a common drive shaft 52, driven by a variable speed prime mover in the form of an internal combustion engine 53.

The high effective output impedance of the alternator ensures that the heating current does not vary significantly with variations in the internal resistance of the battery as the temperature of the latter changes. The capacitors 18 (if fitted) have values which are chosen so as to increase the power factor of the alternator 12 consistent with the AC current supplied by the alternator 12 to the batteries, 20, 22, 24, 26, 28 and 30 remaining at a substantially constant value over the working speed range of the internal combustion engine 53.

In operation, when the system 10 is used to charge batteries when their electrolytes is at an initially low temperature, the internal resistance of the batteries will initially be at a high value thereby preventing the alternator 36 from providing a high charging current to the batteries. However, as the alternator 12 provides an alternating heating current to the batteries, their electrolyte will be subjected to a high rate of heating and will quickly reach a temperature at which their internal resistance has fallen to a value at which high current charging may take place. Because the capacitance values of the capacitors 18 are chosen so that the AC current is substantially constant over the working speed range of the internal combustion 53, there is no danger that the rate of heating will be insufficient at low speeds or excessive at high speeds. Also, although the internal resistance of the batteries falls as the temperature of their electrolyte rises, the alternating current will be prevented from reaching an excessive value by the high inductance of the windings of the permanent magnet alternator together with the capacitors 18.

It should also be noted that as the secondary winding 18 is connected to the mid-points of the pairs of batteries, the direct charging current does not pass through the secondary winding and so there is no danger of the core of the transformer 16 being saturated by the direct current.

Figure 2:
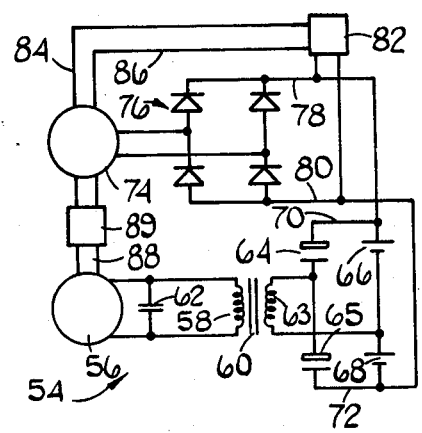

Referring now to FIG. 2, there is shown another combined heating and charging system 54 comprising a single phase permanent magnet generator 56, the output of which is connected to the primary winding 58 of a transformer 60. A capacitor 62 is also connected across the output of the alternator 58. One end of the secondary winding 63 is connected to the mid-point of a pair of series connected capacitors 64 and 65 and the other end of the winding is connected to the mid-point of a pair of series connected batteries 66 and 68. The pair of capacitors and the pair of batteries are connected in parallel between lines 70 and 72.

The system 54 further includes a second alternator 74, the output of which is connected through a rectifier 76 to supply direct current to lines 78 and 80, the lines 78 and 80 being connected to the lines 70 and 72 respectively to charge the batteries 66 and 68. A voltage regulator 82 is also connected across the lines 78 and 80 and is connected through lines 84 and 86 to the alternator 74.

Both alternators 56 and 74 are driven from a common shaft 88 driven by an internal combustion engine 89.

The value of the capacitor 62 is chosen so as to increase the power factor of the alternator 56 and so that the alternator 56 provides a substantially constant AC current over the working speed range of the internal combustion engine 89.

The operation of the system 54 is generally similar to the system 10 shown in FIG. 1, the alternator 56 supplying an alternating current to the batteries 66 and 68 to heat the electrolyte at low temperatures and the alternator 74 providing a charging current.

The capacitors 64 and 65 prevent the direct charging current flowing into the secondary winding 63 and thereby avoid saturation of the core of the transformer 60.

Figure 3:
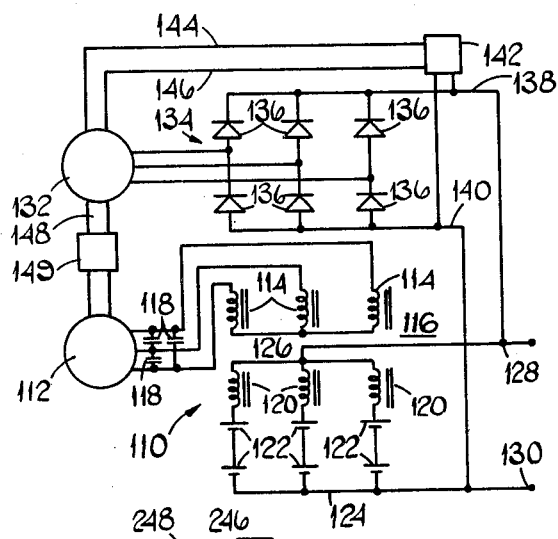

Referring now to FIG. 3, there is shown a combined battery heating and charging system 110 including a three-phase permanent magnet alternator 112, the output of which is connected to the star connected primary winding 114 of a three phase transformer 116. The output of the alternator 112 is also connected to delta connected capacitors 118. The secondary windings 120 of the transformer 116 are connected through batteries 122 to a line 124, and the star point 126 of the secondary windings 120 and the line 124 are connected respectively to a pair of DC terminals 128, 130.

The system 110 also includes a second three phase alternator 132, the output of which is connected through a rectifier 134 having diodes 136 to positive and negative lines 138 and 140, which are connected respectively to the DC terminals 128, 130. A voltage regulator 142 is also connected across the line 138, 140 and is connected to a field winding of the alternator 132 through lines 144, 146 for regulating the current in the said field winding so as to maintain a constant voltage across lines 138, 140.

Both alternators 112 and 132 are driven from a common drive shaft 48, by an internal combustion engine 149.

The values of the capacitors 118 are chosen so as to increase the power factor of the alternator 118 and so that the alternating current remains substantially constant over the working speed range of the engine 149.

The operation of the system 110 is generally similar to the operation of the system 10 shown in FIG. 1, the alternator 112 providing an alternating heating current and the alternator 132 providing a direct charging current.

Figure 4:
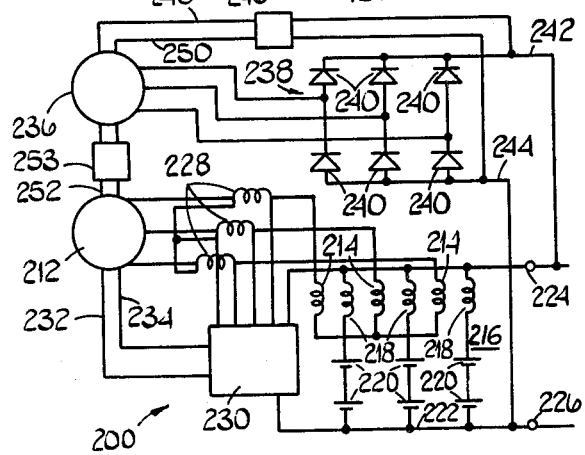

Referring now to FIG. 4, there is shown a combined battery heating and charging circuit 200 including a three phase alternator 212, the output of which is connected to the star connected primary winding 214 of the transformer 216. The secondary windings 218 of the transformer 216 are connected through batteries 220 to a line 222 and the star point of the windings 218 and the line 222 are connected respectively to a pair of DC terminals 224, 226.

A three phase current sensing transformer 228 is provided on the output lines of the alternator 212 and this provides an input signal to a current regulator 230. The current regulator 230 is connected to a field winding of the alternator 212 through lines 232 and 234 and controls the current in the said field winding so as to maintain the output alternating current of the alternator 112 at a substantially constant value, despite variations in the internal resistance of the batteries 120, or in the drive speed.

The system 200 further includes a second three phase alternator 236 which is connected through a rectifier 238 having diodes 240 to supply a direct charging current to lines 242, 244, which are connected respectively to the terminals 224, 226. A voltage regulator 246 is also connected across the lines 242, 244 and controls the current in a field winding of the alternator 236 through lines 248, 250 so as to maintain a constant voltage across the lines 242, 244.

Both of the alternators 212 and 236 are driven from a common drive shaft 252 driven by a variable speed internal combustion engine 253.

In use, the alternator 212 provides a current for heating the electrolyte of the batteries 220 and the alternator 236 provides a charging current.

When the system 200 is used to heat the charge batteries which are initially at a low temperature, the rate of heating will initially be high and the rate of charging will be low because of the relatively high internal resistance of the batteries. Then, as the temperature of the electrolyte rises, the rate of heating will fall with the falling internal resistance, and the rate of charging will rise.

Also, because the alternator 212 provides an alternating heating current which is constant and independent of the speed of the engine 253, there is no danger that the rate of heating the electrolyte will be insufficient at low engine speeds or excessive at high engine speeds.

In the system 110 of FIG. 3 and the system 200 of FIG. 4, the secondary windings 120, 218, of the transformers 116, 216 are wound on a three limb core and, although the direct charging current flows through their windings, there will be no resultant magnetization caused by the direct current if the currents in the three phases are balanced as the magneto-motive force component due to the direct current in the three limbs will also be balanced. Consequently, there is no danger of the core being saturated by the DC current. Furthermore, there will be no significant AC component of voltage at the DC output terminals 28, 30 or 124, 126.

Although in each of the systems described above, both alternators are driven by a common engine, it is to be appreciated that the alternators could be driven by separate engines. Also, although in each system a heating system is shown combined with a charging system, it is to be appreciated that the heating system could be used on its own, for example, to heat the electrolyte of already charged batteries which are required as a power supply.

We claim:

1. A battery heating system comprising at least one storage battery, an alternator connected to supply alternating current to the battery and having output means the effective impedance of which is significantly higher that the maximum internal resistance of the battery, a prime mover for driving the alternator, and means for maintaining the current supplied to the battery at a substantially constant value over the normal working speed range of the prime mover.

2. A battery heating system as claimed in claim 1 including means for sensing the current supplied to the battery and a current regulator responsive to said current sensing means to maintain the alternating current substantially constant.

3. A battery heating system as claimed in claim 2 in which the alternator has a field winding and the current regulator controls the current in the field winding.

4. A battery heating system as claimed in claim 1 in which the alternator is a permanent magnet alternator.

5. A battery heating system as claimed in claim 4 in which a capacitor or capacitors is or are connected across the output of the alternator.

6. A battery heating system as claimed in claim 1 or any one of claims 2 to 5 further including a transformer having a primary winding connected to the output of the alternator and a secondary winding connected to the battery or batteries.

7. A battery heating system as claimed in claim 6, which includes a pair of DC output terminals and in which the alternator is a polyphase alternator, the transformer is a polyphase transformer, and the secondary windings of the transformer are star connected with the star point being connected to one DC terminal and the ends of the windings being connected by respective batteries to the other DC terminal.

8. A battery heating system as claimed in claim 1 or any one of claims 2 to 5 combined with a battery charging system comprising a second alternator, the first and second alternators being driven by a common prime mover, and a rectifier the input of which is connected to the output of the second alternator and the output of which is connected to charge the battery or batteries.

* * * * *